United States Patent [19]

Peterson

[11] Patent Number: 4,968,489
[45] Date of Patent: Nov. 6, 1990

[54] UV LAMP ENCLOSURE SLEEVE

[75] Inventor: Ronald L. Peterson, Tucson, Ariz.

[73] Assignee: Peroxidation Systems, Inc., Tucson, Ariz.

[21] Appl. No.: 458,608

[22] Filed: Dec. 29, 1989

Related U.S. Application Data

[63] Continuation-in-part of Ser. No. 243,908, Sep. 13, 1988, Pat. No. 4,897,246.

[51] Int. Cl.$^5$ .............................................. B01J 19/12
[52] U.S. Cl. ............................ 422/186.3; 422/186.07; 250/436; 250/437
[58] Field of Search ...................... 422/186.3, 186.07; 250/437, 436

[56] References Cited

U.S. PATENT DOCUMENTS

| | | | |
|---|---|---|---|
| 4,855,112 | 8/1989 | Adcock | 422/186.23 |
| 4,897,246 | 1/1990 | Peterson | 422/186.3 |

*Primary Examiner*—Stephen J. Lechert, Jr.
*Assistant Examiner*—Nina Bhat
*Attorney, Agent, or Firm*—Daniel C. Mckown

[57] ABSTRACT

In an oxidation chamber for treating wastewater, an ultraviolet lamp is mounted inside a quartz tube that is surrounded by the wastewater in the oxidation chamber. During operation, the quartz tube becomes quite hot and becomes coated with a film of slime that reduces transmission of the ultraviolet radiation into the wastewater. This results in gradually decreasing efficiency of operation until its becomes necessary to interrupt the operation of the chamber and to remove the quartz tube so that it can be cleaned to restore the transmission.

In accordance with the present invention it has been found advantageous to apply a thin layer of fluoroethylene propylene (FEP) to the outer surface of the quartz tube. It has been found that the FEP layer is less susceptible to the deposition of slime than is the unprotected quartz tube, and that the slime is more easily removed from the FEP layer than from an unprotected quartz tube. Further, the FEP layer strengthens the quartz tube and protects it from localized stresses and damage caused by impact. This protective effect makes it possible to use quartz tubes having thinner walls, and that increases the transmission of the ultraviolet radiation through the quartz wall. The FEP layer also reduces handling damage to the quartz tube and protects the maintenance workers from injury.

9 Claims, 2 Drawing Sheets

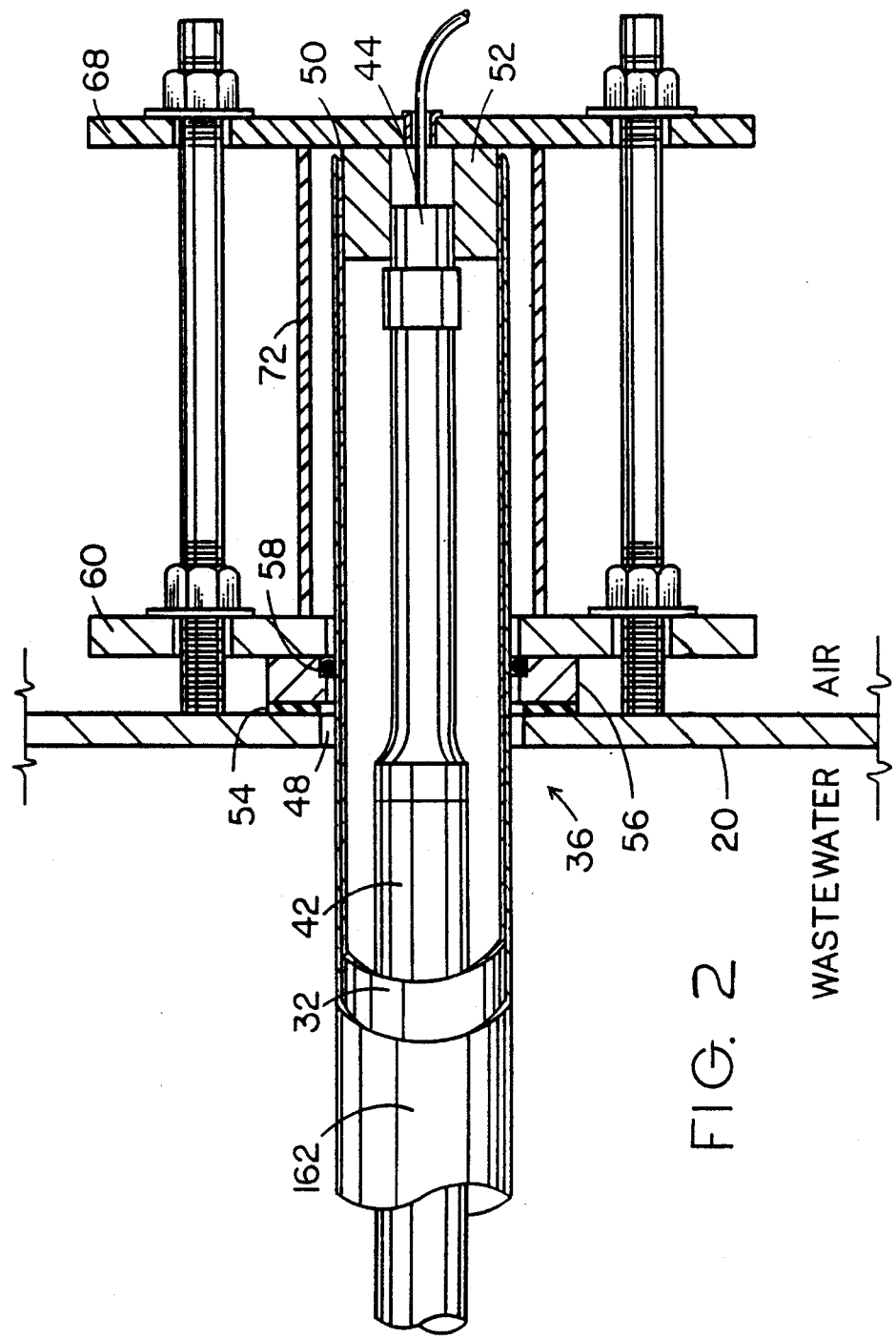

UV LAMP ENCLOSURE SLEEVE

This application is a continuation-in-part of Application Ser. No. 07/243,908 filed Sept. 13, 1988 for OXIDATION CHAMBER by Ronald L. Peterson, now U.S. Pat. No. 4,897,246.

BACKGROUND OF THE INVENTION

1. Field of the Invention

The present invention is in the field of wastewater treatment and specifically relates to an improvement in apparatus for use in destroying dissolved organic contaminants in the wastewater. The design of the apparatus is described more fully in U.S. Pat. No. 4,897,246 referred to above, and the contents of that patent are incorporated by reference into the present application.

2. The Prior Art

As described in the aforesaid patent, the water treating apparatus includes an oxidation chamber in which the wastewater is subjected to intense ultraviolet radiation as well as oxidation by hydrogen peroxide that is added to the wastewater. The ultraviolet radiation is generated by a number of ultraviolet lamps that extend coaxially through quartz, tubes that, in turn, extend through the walls of the oxidation chamber.

One of the problems that has been encountered in the use of the oxidation chamber is a tendency for the quartz tubes gradually to become coated over with a film of a dark colored slime. This fouling of the quartz tubes is undesirable because it interferes with the transmission of the ultraviolet radiation from the lamp to the wastewater. When the fouling becomes sufficiently serious, it is necessary to interrupt the treatment of the wastewater to remove and clean the exterior of the quartz tubes. Clearly, it is desirable to minimize such interruptions in the operation of the oxidation chamber.

A solution to the problem was not found in the prior art. For example, in U.S. Pat. No. 4,694,179, Lew, et al. described a sterilizer in which ultraviolet light is used to destroy bacteria and other germs that contaminate a fluid medium. In that apparatus, the ultraviolet lamp is enclosed within an ultraviolet-transparent tube which is described as being composed of a hard glass. The problem of fouling is not discussed, and no solution to it is suggested by the patent.

In U.S. Pat. No. 4,273,660, Beitzel shows a fluid treatment chamber of annular cross section, with an ultratreatment violet lamp extending axially through the chamber. Thus, the tube that surrounds the lamp also serves as a wall of the chamber. The problem of fouling is not discussed, and it would appear to be difficult to clean the wall by mechanical means.

In U.S. Pat. No. 3,485,576, McRae, et al. describe an ultraviolet apparatus for disinfection of aqueous liquids. In their system, the envelope of the ultraviolet lamp is in direct contact with the liquid. The problem of attenuation of the ultraviolet radiation by a buildup of slime on the lamp is described, and the use of manually-operated wipers is said to be known. The solution patented by McRae, et al. is to pass a direct electric current between the plasma in the lamp and an electrode located in the liquid external to and out of direct physical contact with the outside surface of the lamp so as to produce a negative charge on the outside wall of the lamp, whereby the charged colloidal particles are electrically attracted to an external anode grid where they are deposited. The present invention makes use of an entirely different approach from the electrical technique used by McRae, et al.

SUMMARY OF THE INVENTION

The solution found by the present inventor consists of applying a thin layer of FEP (a perfluorinated ethylene-propylene polymer) available from DuPont as TEFLON FEP ® to the surface of the quartz tube that is in contact with the wastewater. The build-up of slime on the FEP is much slower than it is on quartz, and the FEP is more easily cleaned than the unprotected quartz. When the FEP sleeve is used, the oxidation chamber does not require maintenance as often, and the maintenance is easier and safer to perform.

In accordance with a preferred embodiment of the invention, a thin layer of FEP is applied to parts of the surface of the quartz tube that surrounds the ultraviolet lamp envelope. The layer of FEP may be applied to the quartz surface in the form of a sleeve, or in the form of a spiral winding that progresses along the quartz tube, in the form of a non-progressive wrapping, or in the form of a coating produced by dipping the quartz tube into a suspension of FEP.

As mentioned above, the FEP surface is less susceptable to the deposition of slime than is the unprotected surface of the quartz tube. Not only does this reduce the frequency of maintenance and facilitate the cleaning process, but in addition the reduced fouling results in greater reaction efficiency made possible by the increased transmission of the ultraviolet radiation into the wastewater.

In addition to the main object of reducing maintenance, the application of FEP to the quartz tube produces a number of benefits that were not contemplated initially.

The FEP sleeve or coating permits the use of quartz tubes having a thinner wall. The FEP layer reduces the localized stresses where the tube is sealed to the chamber It also protects the quartz tube from damage by impact, and it provides thermal insulation for the quartz tube.

In addition, the FEP layer protects maintenance workers from the sharp edges often present at the ends of the quartz tube and reduces breakage during handling. Finally, unlike the unprotected quartz tube, the FEP layer has no tendency to stick to the sealing 0-ring after the oxidation chamber has been in use for some time, and this feature facilitates disassembly when maintenance is required. The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood , however, that the drawings are for the purpose of illustration and description only and are not intended as a definition of the limits of the invention.

DETAILED DESCRIPTION OF THE PREFERRED EMBODIMENT

Figure 1:
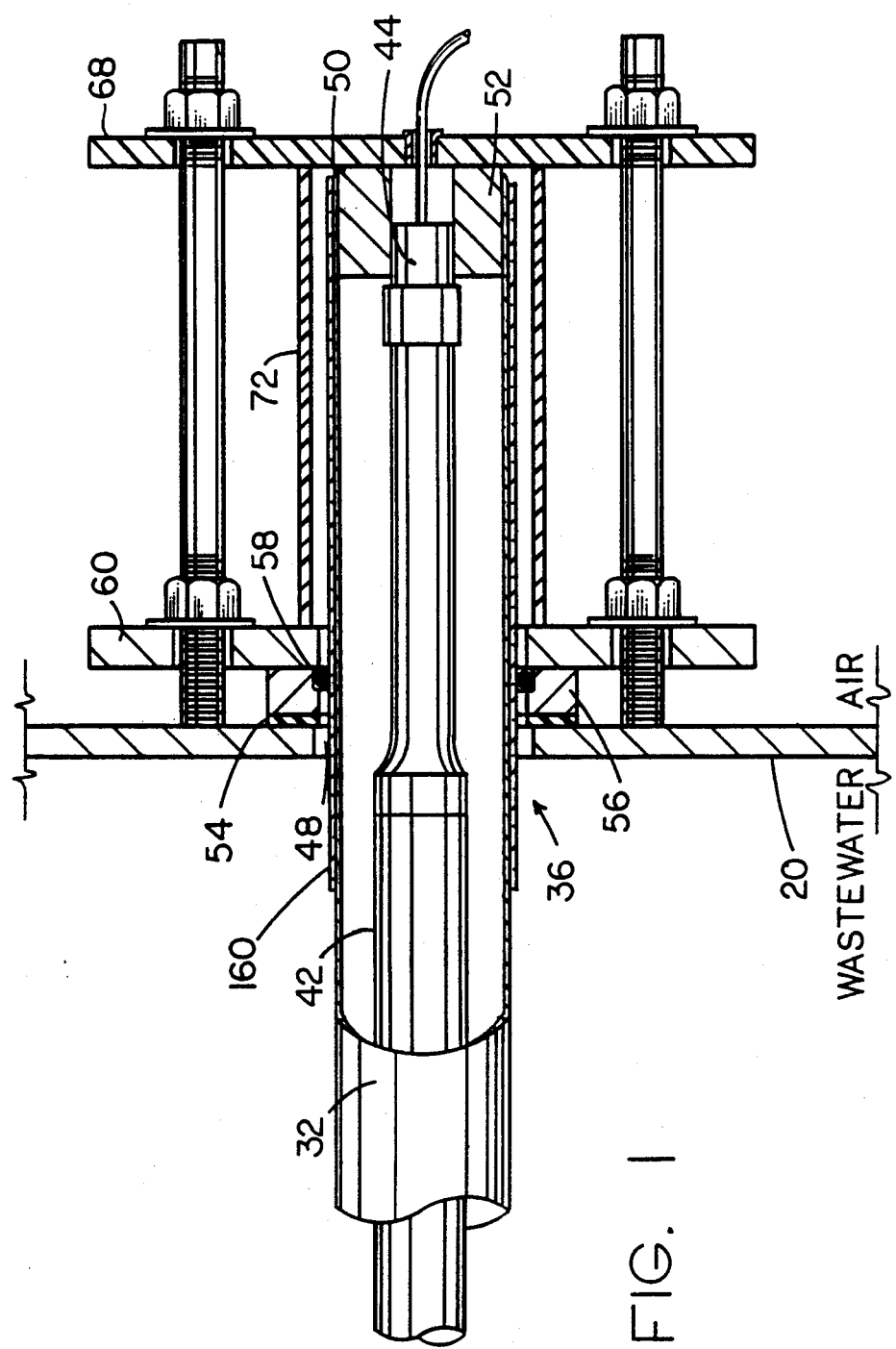
FIG. 1 is a side elevational view, partly in cross section, showing a preferred embodiment of the present invention; and, FIG. 2 is a side elevational view partially in cross section showing an alternative embodiment of the present invention.

FIGS. 1 and 2 resemble, but are not idential to, FIG. 2 of U.S. Pat. No. 4,897,246. Wherever possible, the reference numerals will identify the same parts as in that patent.

As described more fully in the patent, the wastewater lies to the left of the wall 20 of the oxidation chamber as shown in FIGS. 1 and 2. The ultraviolet lamp 42 is contained within a quartz tube 32 that extends completely through the oxidation chamber and that protrudes beyond opposite walls of the oxidation chamber, of which the wall 20 is typical. Leakage between the quartz tube 32 and the wall 20 is prevented by the lamp seal assembly 36.

The ultraviolet lamp 42 is supported at its end portion 44 by a cylindrical plug 52 within which the end portion 44 can slide freely, and which itself can slide freely within the quartz tube 32.

The lamp seal assembly 36 eliminates the need to machine O-ring grooves in the wall 20 of the chamber; instead, it is necessary only to bore the aperture 48 in wall 20, and even this does not have to be held to a close tolerance. A gasket 54 is compressed by the force exerted on the O-ring retainer 56 by the compression plate 60. The O-ring retainer 56 includes an accurately machined O-ring seating surface for the O-ring 58.

A cover tube 72 of a phenolic material surrounds the portion of the lamp that extends beyond the compression plate 60 for the purpose of suppressing radio frequency emanations that are generated by the end portion of the lamp when the lamp is in operation. The cover tube 72 is held in place by pressure exerted by the cover plate 68.

In accordance with the present invention, a layer 160 of FEP is applied to the outside surface of the quartz tube 32. In a preferred embodiment the layer 160 extends beyond the end 50 of the quartz tube approximately two millimeters. This extension guards the workers against being cut by any sharp edges that may be present on the end 50, and further serves to prevent chipping of the end 50 during handling.

In the other direction, the layer 160 extends into the oxidation chamber a short distance, typically a few centimeters The O-ring 58 bears against the layer 160. It has been found that when the layer 160 is not used, the O-ring 58 has a tendency to adhere to the quartz tube 32 after extended use of the chamber, but the O-ring has no tendency to adhere to the layer 160. In this way the layer 160 facilitates disassembly.

Since absorption of the ultraviolet radiation is not a consideration near the ends of the quartz tube, the FEP layer 160 can be approximately 0.5 millimeter thick. This thickness provides additional strength and impact resistance to the end portions of the quartz tube, and these are the portions most susceptible to damage. In the preferred embodiment, a sleeve of FEP is slid onto the quartz tube. The FEP sleeve has a tendency to shrink upon heating, and this causes it to grip the quartz tube tightly, thereby eliminating any possibility that the wastewater will leak out between the sleeve and the quartz tube.

FIG. 2 shows an alternative embodiment of the invention in which a layer 162 of FEP extends the entire length of the quartz tube 32 and approximately 2.0 millimeters beyond the ends of the tube. In this embodiment, the thickness of the FEP layer should be approximately 0.125 millimeter, although layers as thick as 0.5 mm and as thin as 0.025 millimeter can be used. Thicknesses less than 0.025 millimeter cause the layer to lack strength and durability, and thicknesses greater than 0.5 millimeter result in excessive absorption of the ultraviolet radiation.

The layer of FEP can be applied to the quartz tube in the form of a sleeve, or in the form of a strip that is wound onto the quartz tube, or in the form of a coating applied by dipping the tube into a suspension of FEP and then baking the coating.

The FEP layer allows installation of turbulence inducers at the surface of the quartz tube. These may take the form of spiral wrapping, adjacent circumferential rings, or longitudinal ribs. The turbulence inducers further reduce the likelihood of material deposition on the tube, and they increase the heat transfer from the tube while increasing the efficiency of the oxidation process by providing better mixing of the wastewater.

The FEP layer is tough and durable so that it definitely improves the strength of the tube. This permits a reduction in the thickness of the quartz tubes, which partly offsets the loss of transmission in the FEP layer. The FEP layer protects the tube from localized stresses and from impact. This protects the workers from injury due to breakage of the tubes, and the extension of the FEP layer beyond the quartz tube serves to protect the end of the quartz tube from chipping and to protect the workers from any sharp edges that may be present on the end.

Because the FEP layer is less susceptible to deposition of slime, the transmission remains high for a longer time, thereby reducing the frequency of maintenance. When maintenance does become necessary, the slime is more easily removed from the FEP layer than from an unprotected quartz tube, thereby facilitating maintenance.

Thus, there has been described an apparatus for reducing the need for maintenance of an apparatus used to treat wastewater in an oxidation chamber. Several embodiments of the invention have been described and shown, and such variations as would be apparent to one skilled in the art are considered to be within the spirit and scope of the present invention.

What is claimed is:

1. In an oxidation chamber of the type in which an ultraviolet lamp enclosed within a quartz tube extends into the space within the oxidation chamber for the purpose of destroying dissolved organic contaminants present in wastewater within the oxidation chamber, the improvement comprising:
   a layer of perfluorinated ethylene-propylene polymer covering external portions of the quartz tube.

2. The improvement of claim 1 wherein said layer extends from an end of the quartz tube to a point inside the oxidation chamber.

3. The improvement of claim 2 wherein said layer also extends beyond the end of the quartz tube.

4. The improvement of claim 1 wherein said layer extends from one end of the quartz tube to the other end of the quartz tube.

5. The improvement of claim 4 wherein said layer also extends beyond the ends of the quartz tube.

6. The improvement of claim 1 wherein said layer has the form of a sleeve.

7. The improvement of claim 1 wherein said layer of perfluorinated ethylene-propylene polymer has the form of a progressive spiral winding.

8. The improvement of claim 1 wherein said layer of perfluorinated ethylene-propylene polymer has the form of a nonprogressive wrapping.

9. The improvement of claim 1 wherein said layer of perfluorinated ethylene-propylene polymer is a coating.

* * * * *